Nov 29, 1927.  
L. C. COLE  
1,650,693  
CHUCK ACTUATING AND DRIVING MECHANISM  
Filed Feb. 11, 1925  
2 Sheets-Sheet 1
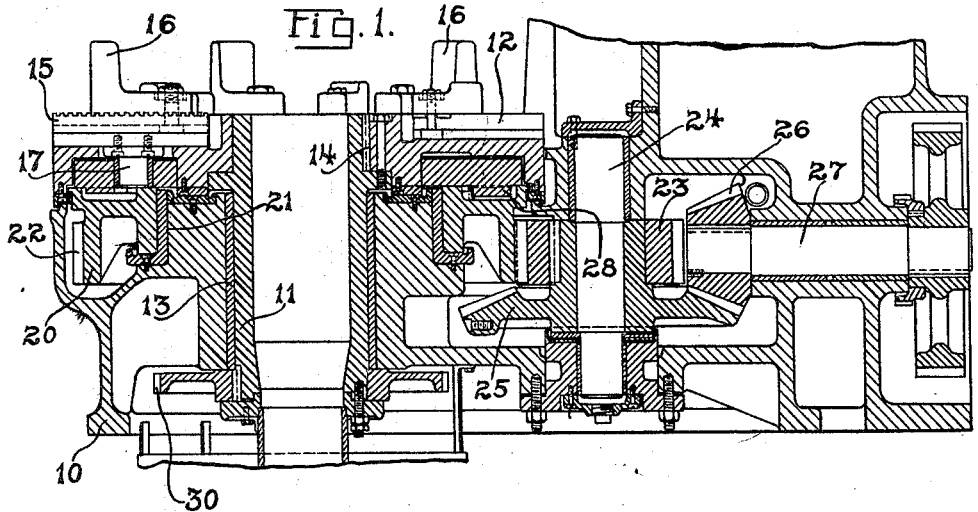
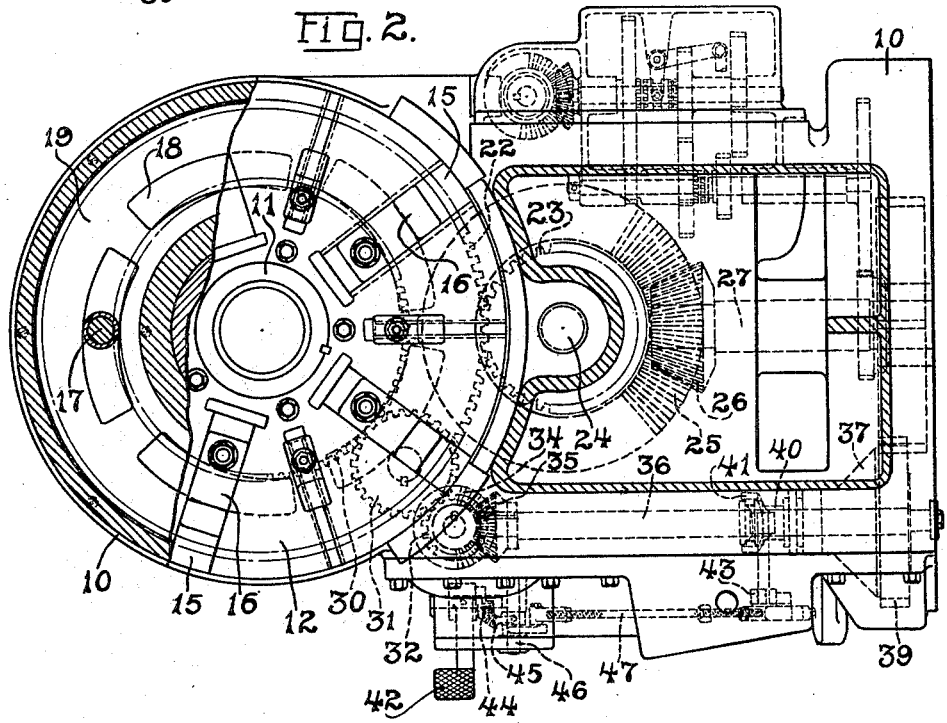
INVENTOR  
L. C. Cole  
BY  
Joseph W. Schofield  
ATTORNEY Nov. 29, 1927.  1,650,693
L. C. COLE
CHUCK ACTUATING AND DRIVING MECHANISM
Filed Feb. 11, 1925  2 Sheets-Sheet 2
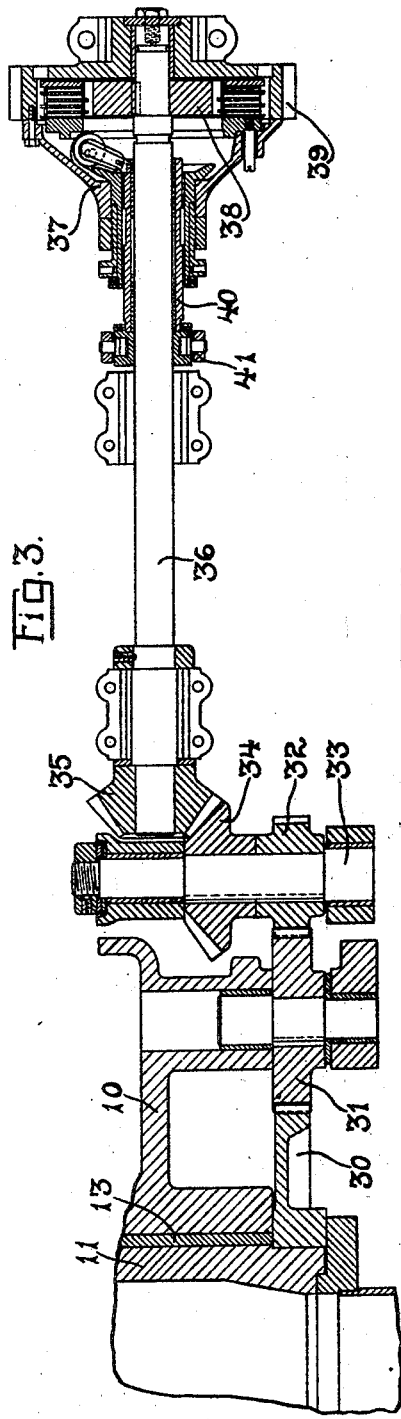
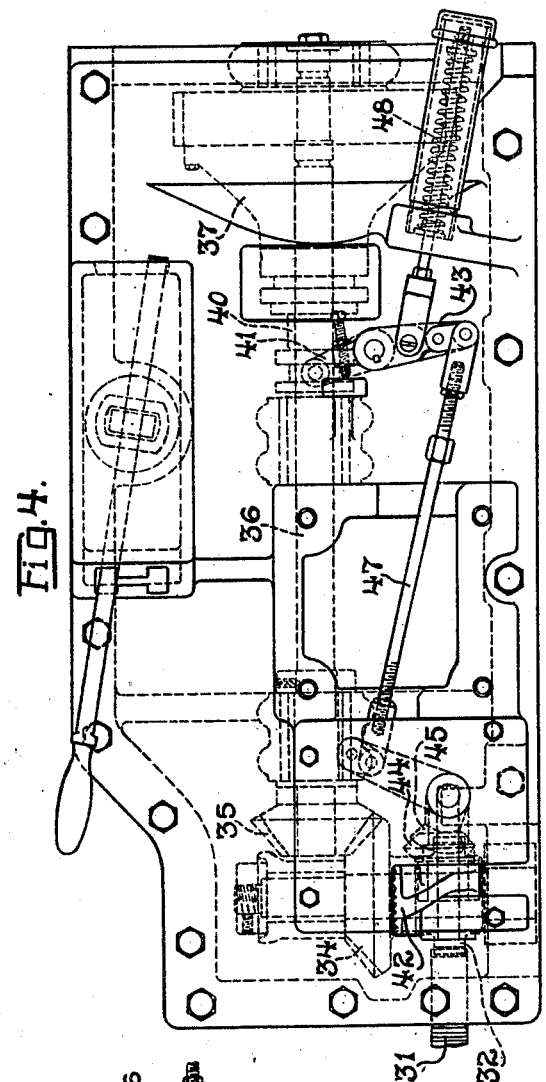
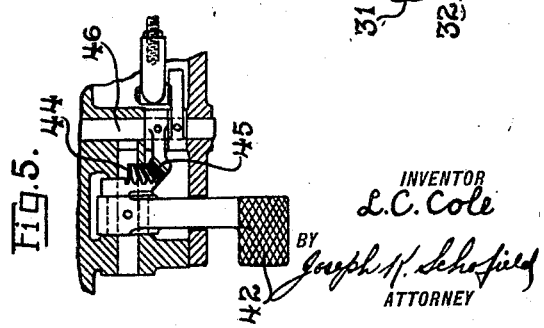
INVENTOR
L.C. Cole
BY Joseph H. Schofield
ATTORNEY Patented Nov. 29, 1927.

1,650,693

UNITED STATES PATENT OFFICE.

LYNDON C. COLE, OF HAMILTON, OHIO, ASSIGNOR TO NILES-BEMENT-POND COMPANY, OF NEW YORK, N. Y., A CORPORATION OF NEW JERSEY.

CHUCK ACTUATING AND DRIVING MECHANISM.

Application filed February 11, 1925. Serial No. 8,436.

This invention relates to work supporting and rotating tables primarily adapted for boring mills or similar machine tools, and more particularly to means for opening and closing work holding chuck jaws thereon.

A primary object of the present invention is to provide an improved chuck jaw actuating mechanism for rotating work supporting tables on boring mills or similar machines so that work may be expeditiously mounted upon and removed from the table.

Another principal object of the invention is to provide simple and expeditious chuck jaw actuating means which may be operated while the work table is continued in rotation in the driving direction and without stopping the driving motor.

Another object of the invention is to provide supplemental rotating means for the work table and its spindle independent of the normal driving means so that these parts may be rotating at a different rate of speed than an annular cam member normally used for driving the table and holding the chuck jaws in their work engaging position, this relative movement between the annular cam member and the table being used to move the chuck jaws to their inoperative or working releasing position.

Another object of the invention is to provide quick means for controlling this supplemental rotating or driving means for the table so that the operator is enabled to quickly withdraw the chuck jaws from engagement with the work and, upon releasing the supplemental driving means, the jaws will again be moved to tightly engage the work being operated on.

With the above and other objects in view, my invention consists in the features of construction and operation set forth in the following specification and illustrated in the accompanying drawings.

In the accompanying drawings annexed hereto and forming a part of this specification, I have shown my invention embodied in a boring mill substantially similar to that described and claimed in the patent to Wais No. 1,296,885 granted March 11, 1919, but it will be understood that the invention can be otherwise embodied and that the drawings are not to be construed as defining or limiting the scope of the invention, the claims appended to this specification being relied upon for that purpose.

In the drawings:

Figure 1 is a vertical sectional view of the work rotating table and adjacent parts of a boring mill.

Fig. 2 is a plan view of the same, parts being broken away to more clearly illustrate their construction.

Fig. 3 is a detail view of the supplemental driving means for directly driving the work rotating spindle and table.

Fig. 4 is a separate view of the unit containing the suplemental driving means for the table, and Fig. 5 is a detail view in section of the controlling lever for actuating this supplemental driving means.

In the above mentioned drawings I have shown but one embodiment of the invention which is now deemed preferable, but it is to be understood that changes and modifications may be made within the scope of the appended claims without departing from the spirit of the invention.

Briefly, my invention, in its broadest aspect, comprises the following principal parts: first, a work rotating spindle having a table rigidly secured thereto and rotating therewith; second, chuck jaws radially movable upon the table; third, a cam plate adapted normally to rotate with and mounted coaxially of the table; fourth, cam grooves on the cam plate engaging depending projections upon the movable jaws; fifth, driving means engaging a member rotating with the cam member or plate for rotating the table during normal operation; sixth, independent or supplemental driving means directly connected to the spindle for rotating this spindle and table at a speed differing from that normally imparted to the annular member; seventh, means to render this supplemental driving means operative or inoperative during the rotation of the table during normal operations.

Referring more in detail to the figures of the drawings, I show a boring mill of the type disclosed and claimed in the above mentioned patent having a base 10 and provided with a rotatable work spindle 11 and table 12. Preferably and as shown, this spindle 11 is mounted vertically in a suitable bearing 13 through the base 10 and at its upper end has the work supporting table 12 adapted to rotate therewith. This spindle 11 and table 12 may be secured together in any conventional manner, as by a key 14 shown in Fig. 1. Mounted for radial movement in the work supporting table 12 are chuck actuating members 15 having work engaging jaws 16 adjustably secured to their upper surface. Depending from the lower surfaces of the chuck jaw actuating members 15 are projections 17 adapted to engage cam slots or grooves 18 provided in an annular cam member or plate 19. This annular cam member 19 is mounted coaxially with the spindle 11 and so that it may move angularly relative to the table 12. Also, this annular cam member 19 is provided with a cam groove 18 for each of the chuck actuating members 15. These cam grooves 18, as shown clearly in Fig. 2, are slightly spiral so that at one end they are slightly nearer the axis of rotation of the annular cam member 19 and table 12 than at their opposite ends. It will therefore be seen that angular movement of this annular cam member 19 relative to the table 12 will move the chuck actuating members 15 and jaws 16 slightly toward or from the axis of rotation of the table 12. It is this radial movement of the chuck actuating members 15 which moves the chuck jaws 16 into and out of driving engagement with work mounted upon the table 12.

In order to drive the table 12 during normal operation, a driving member 20 is provided for the annular cam member 19 which, as shown, may be rotatably mounted upon a suitable bearing 21 provided in the base 10, positioned coaxially with the table 12 and provided with gear teeth 22 about its periphery. This gear 22 is adapted to be driven by a pinion 23 upon a short vertically mounted shaft 24 on which is provided a bevel gear 25 in mesh with another bevel gear 26 upon a main driving shaft 27. Rotation of this shaft 27 will therefore rotate the table 12 through the cam member 19. The engagement between this annular driving member 20 and the annular cam member 19 may be similar in every way to that disclosed in the patent to Wais, so that a projection upon the driving member engages a corresponding projection 28 on the annular cam member 19 and normally drives the table 12 and spindle 11 during operation of the machine.

In order to effect relative rotative movement between the annular cam member 19 and the table 12 to actuate the chuck actuating members 15 radially, a gear 30 is keyed preferably directly to the lower end of the spindle 11. This gear 30 is in mesh with an intermediate gear 31 which in turn is in mesh with a pinion 32 upon a short vertical shaft 33 provided with the bevel gear 34. The bevel gear 34 is adapted to be driven by a bevel pinion 35 in mesh therewith upon the forward end of a horizontal driving shaft 36. Near the opposite end of this shaft 36 is a friction clutch 37 preferably of the disc type, one set of the discs being rotatable with a central member 38 keyed directly to this shaft 36. The other set of discs is rotatable with a spur gear 39 which may be driven from any suitable source, preferably by a small independent electric motor (not shown). In order to operate this friction clutch 37 a member 40 slidable axially along the shaft 36 is provided which moves the discs into or out of clamping position. In order to effect axial movement of this member 40, a yoke 41 pivotally mounted engages an annular groove on this member 40. This yoke 41 is movable by a foot pedal 42 connected to a lever 43 on the yoke 41. As shown in Figs. 4 and 5, the foot pedal 42 is pivotally mounted and provided with a segmental gear 44 in mesh with a corresponding segmental gear 45 mounted upon a short shaft 46 and adapted, when it is oscillated by movement of the foot lever 42, to actuate a pull rod 47 to oscillate the yoke 41 and thus move the friction clutch 37 into or out of clamping position. Normally the friction clutch 37 is held in its unclamped position by means of a spring 48 attached as shown in Fig. 4 to the lever 43 on the actuating yoke 41.

It will be seen from the above described mechanism that when the pedal 42 is depressed the friction clutch 37 will be moved to clamped position, thus rotating the driving shaft 36 and the gear 30 upon the lower end of the spindle 11. As soon as the foot lever 42 is released, the friction 37 is again moved to unclamped position and independent rotation of this shaft 36 is discontinued.

The rotative speed of the shaft 36 is such that when driven from its own gear 39 the gear 30 upon the spindle 11 rotates this spindle 11 and the table 12 at a higher rotative speed than the driving member 20 for the annular cam member 19. The effect of this, therefore, will be to advance the table 12 slightly relative to the cam member 19 and move the chuck actuating members 15 to the opposite ends of the cam slots 18, the jaws 16 therefore being moved to their inoperative or released positions. As soon as the foot lever 42 is released and the clutch 37 is unclamped, the table 12 will again be driven by the driver 20 for the annular cam member 19, the shaft 36 and connected parts being then rotated by the gear 30 on the spindle 11. This resistance to rotation by the table 12 relatively moves the cam plate 19 to an advanced position, thus again closing the jaws 16 upon the work.

In operation when it is desired to unclamp the work from the table 12, the operator depresses the foot lever 42 so that the friction clutch 37 is clamped and the shaft 36 which, during normal operation, has been rotated by the spindle 11 has its rotative speed increased and thus advances the spindle 11 and table 12 angularly relative to the annular cam member 19, thus opening the jaws 16. As soon as the work has been removed and a new blank positioned on the table 12, the foot lever 42 is released, thus unclamping the friction clutch 37 and causing the table 12 again to be driven at normal speed by the annular cam member 19. Without the supplemental driving means rotating the table 12 the annular cam member 19 is advanced angularly relative to the table 12, thus moving the chuck actuating members 15 and jaws 16 again to their operative and work engaging positions.

The operation of the chuck actuating members 15 may therefore take place during normal operation of the table 12 and while the driving pinion 23, driving member 20 and annular cam member 19 are being rotated normally, so that no reversals of rotation of the table 12 are required. Also, as during the cutting or other operations upon the work, the spindle 11 rotates the shaft 36 and the friction clutch 37 it is only necessary for the frictionally driven gear 39 to bring the speed of the shaft 36 from normal to a slightly greater speed to effect the unclamping operation. Similarly, as soon as the work on table 12 has been mounted and the machine is again in normal condition for operation, the shaft 36 and connected parts are driven by the gear 30 on the lower end of the spindle 11, thus placing a drag or resistance upon member 19 to aid in firmly tightening the chuck jaws 16 upon the work.

What I claim is:

1. A rotatable work support for boring mills comprising in combination, a base, a table rotatably mounted thereon, a cam member rotatably mounted coaxially of the table, cooperating jaw actuating means on the table and cam member, normally operative power driving means for the cam member, and independent driving means for the table adapted to rotate the table at an increased speed during the normal operation of the driving means for the cam member.

2. A rotatable work support for boring mills comprising in combination, a base, a spindle rotatably mounted therein, a table secured thereto, a cam member rotatably mounted coaxially of the table, radially movable work engaging jaws on said table, means on said cam member to actuate said jaws when the table and cam member are rotated relatively to each other, driving means for said cam member, independent driving means for said spindle and table, and means to render the independent driving means operative or inoperative during the normal operation of the driving means for the cam member.

3. A rotatable work support for boring mills comprising in combination, a base, a spindle rotatably mounted therein, a table secured thereto, a cam member rotatably mounted coaxially of the table, radially movable work engaging jaws on said table, cam grooves on said cam member to actuate said jaws when the table and cam member are rotated relatively to each other, driving means for said cam member normally operative to drive the cam member and table, and independent driving means for said spindle and table operative momentarily to advance the table relative to the cam member to operate the jaws.

4. A rotatable work support for boring mills comprising in combination, a base, a spindle rotatably mounted therein, a table secured thereto, a cam member rotatable relative to said table and mounted coaxially therewith, radially movable work engaging jaws on said table, spiral cam slots in said cam member whereby relative rotative movement of the table and annular member moves said jaws radially, means to drive the cam member, and independent means to drive the spindle and table momentarily at a different speed to actuate the jaws.

5. A rotatable work support for boring mills comprising in combination, a base, a spindle rotatably mounted therein, a table secured thereto, a cam member rotatable relative to said table and mounted coaxially therewith, radially movable work engaging jaws on said table, cam slots in said cam member whereby relative rotative movement of the table and annular member moves said jaws radially, means to drive the cam member, independent means to drive the spindle and table at a different speed to actuate the jaws, and means to render the independent driving means operative or inoperative during the normal operation of the driving means for the cam member.

6. A rotatable work support for boring machines comprising in combination, a base, a spindle rotatably mounted therein, a table secured thereto, a cam member rotatable relative to said table and mounted coaxially therewith, work engaging jaws on said table, cam slots in said cam member whereby relative rotative movement of the table and cam member moves said jaws radially, power means to normally drive the cam member, and independent means to frictionally drive the spindle and table at a different speed to advance the cam member relative to the table and actuate the jaws.

In testimony whereof, I hereto affix my signature.

LYNDON C. COLE.